US012315506B2

(12) United States Patent
Sharifi et al.

(10) Patent No.: US 12,315,506 B2
(45) Date of Patent: May 27, 2025

(54) BIASING SPEECH PROCESSING BASED ON AUDIBLY RENDERED CONTENT, INCLUDING DYNAMICALLY ADAPTING OVER DURATION OF RENDERING

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 283 days.

(21) Appl. No.: 17/829,921

(22) Filed: Jun. 1, 2022

(65) Prior Publication Data

US 2023/0395071 A1    Dec. 7, 2023

(51) Int. Cl.
*G10L 15/22* (2006.01)
*G06F 3/16* (2006.01)
*G06F 40/166* (2020.01)
*G10L 15/06* (2013.01)
*G10L 17/22* (2013.01)
*H04L 67/12* (2022.01)
*H05B 47/12* (2020.01)

(52) U.S. Cl.
CPC ............ *G10L 15/22* (2013.01); *G10L 15/063* (2013.01); *G10L 2015/228* (2013.01)

(58) Field of Classification Search
CPC ................................ G06F 3/0113; G10L 15/22
USPC .......................................................... 715/530
See application file for complete search history.

(56) References Cited

U.S. PATENT DOCUMENTS

| | | | |
|---|---|---|---|
| 2004/0205655 A1* | 10/2004 | Wu | G06F 40/166 715/201 |
| 2017/0242657 A1* | 8/2017 | Jarvis | G10L 17/22 |
| 2019/0074008 A1* | 3/2019 | Beckhardt | G10L 15/22 |
| 2020/0265838 A1* | 8/2020 | Lee | G06F 3/167 |
| 2021/0029803 A1* | 1/2021 | Olaleye | H05B 47/12 |

(Continued)

FOREIGN PATENT DOCUMENTS

| | | | |
|---|---|---|---|
| CN | 115881130 A | * | 9/2021 |
| WO | 2020226665 A1 | | 11/2020 |

OTHER PUBLICATIONS

European Patent Office; International Search Report and Written Opinion issued in Application No. PCT/US2022/051783; 12 pages; dated Apr. 21, 2023.

*Primary Examiner* — Farzad Kazeminezhad
(74) *Attorney, Agent, or Firm* — Gray Ice Higdon

(57) ABSTRACT

Implementations set forth herein relate to an automated assistant that can bias speech processing towards certain requests according to whether those requests are relevant to content that is being rendered, or is expected to be rendered, at a computing device. In this way, speech processing can be dynamically biased according to features of content that may be rendered by a particular application and/or a particular device. Biasing can be performed during rendering of a portion of content determined to be relevant to a particular request by adjusting a score threshold which is generated based on a quantity and/or rate, in historical usage data, that is used for determining whether a particular request was received. When the portion of content is no longer being rendered, the threshold can return to a particular value, or be adjusted again according to a subsequent portion of the content.

17 Claims, 6 Drawing Sheets

(56) References Cited

U.S. PATENT DOCUMENTS

| | | |
|---|---|---|
| 2022/0068268 A1 | 3/2022 | Kracun et al. |
| 2022/0308660 A1* | 9/2022 | Patnaikuni ............. H04L 67/12 |

* cited by examiner

BIASING SPEECH PROCESSING BASED ON AUDIBLY RENDERED CONTENT, INCLUDING DYNAMICALLY ADAPTING OVER DURATION OF RENDERING

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

As mentioned above, an automated assistant can process audio data, that captures a spoken utterance of a user, in determining whether and/or how to perform one or more assistant actions. For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

An automated assistant can include additional or alternative speech processing engine(s). For example, some speech processing engines can utilize certain on-device machine learning (ML) model(s) (also referred to herein as "warm word model(s)") that are trained to be utilized in at least selectively monitoring for particular word(s) and/or phrase(s) in audio data captured via microphone(s) of a client device. Such a warm word model can be trained to process audio data to generate output that indicates whether particular word(s) and/or phrase(s) (also referred to herein as "warm word(s)"), for which the model is trained, are present in the audio data. If the output indicates that the particular word(s) and/or phrase(s) are present, then a corresponding fulfillment can be performed. Optionally, the fulfillment can be performed without necessitating performing speech recognition and/or without necessitating performing NLU. For instance, a given warm word model can be trained to generate output that indicates whether speech of "volume up" is present in audio data and the speech processing engine can at least selectively (e.g., at least when audio output is being rendered) process audio data using the given warm word model. If output generated using the given warm word model indicates speech of "volume up" is present in the audio data, then a fulfillment can be performed that, for example, increases the volume by X amount (e.g., X % or X level(s)).

Processing audio data to recognize speech and/or to monitor for presence of warm word(s) can be inhibited by, for example, an audio output being rendered by the device receiving the speech, a nearby device that is rendering audio output, and/or other background noise(s). For example, a user may request that the automated assistant play music via a particular home device (e.g., a standalone speaker device), and subsequently—while music is playing—provide a spoken request that the automated assistant perform some other operation (e.g., set a reminder, pause the music, increase the volume, or skip to a next song). However, audio data that captures the spoken request can also capture the playing music, capture background noise (e.g., from other device(s) and/or human(s)), and/or otherwise not clearly capture the spoken request (e.g., due to the user speaking at a low volume, being far away from the microphone(s) that capture the audio data, etc.). This can have a negative impact on processing of the audio data by the automated assistant. For example, any speech embodied in audio data captured by the home device may be muffled and/or distorted as a result of being combined with other audio signals (e.g., the playing music). As a result, a speech processing engine tasked with processing audio data may not be able to accurately and/or robustly do so in various circumstances. This can result in misrecognition of the speech, or lack of recognition of speech, which can be frustrating and also waste computational resources. For example, a speech processing engine that is processing audio data, using a warm word model to monitor for particular word(s) and/or phrase(s), can determine, based on output generated based on the processing, that the particular word(s) and/or phrase(s) are not present in the audio data—despite the audio data including one of the particular word(s) or phrase(s). This can result in a corresponding fulfillment not being performed, inhibiting the interaction between the automated assistant and a user and prolonging that interaction (e.g., forcing the user to repeat the particular word(s) or phrase(s) or utilize alternative input(s) in causing the corresponding fulfillment to occur).

SUMMARY

Implementations set forth herein relate to dynamically adapting speech processing based on one or more characteristics of content that is expected to be rendered, and/or is currently being rendered, at a device associated with an automated assistant. The content can be, for example, audio and/or visual media that is being rendered at one or more interfaces of a computing device, and the automated assistant can be accessible via that computing device and/or a separate computing device.

In some implementations, the speech processing adaptation can include biasing toward and/or away from determining that certain spoken term(s) are present in audio data that is captured via microphone(s) during rendering of the content. For example, automatic speech recognition (ASR), based on the audio data, can be biased toward certain term(s) and/or away from other certain term(s) during rendering of at least a portion of the content. As another example, speech processing of the audio data using a warm word model, to monitor for occurrence of speaking of term(s) for which the warm word model is trained, can be biased toward finding those term(s) which are present during rendering of at least a portion of the content.

In some versions of those implementations, the speech processing adaptation can vary over the duration of the content. For example, processing can be biased toward certain term(s) during a first portion of the content, while not biased (or even biased away from the certain term(s)) during a second portion of the content. For instance, processing can be biased toward "volume down" and/or "down" during the first portion responsive to determining the first portion has certain loudness feature(s), while not biased toward "volume down" or "down" during the second portion responsive to determining the second portion lacks the certain loudness feature(s). Also, for instance, processing can be biased toward "volume down" and/or "down" during the first portion responsive to determining the first portion is the initial X seconds or Y % of the content, while not biased toward "volume down" or "down" during the second portion responsive to determining the second portion is after the initial X seconds or Y % of the content (and optionally, before the final X seconds or Y % of the content). As yet another instance, processing can be biased toward "slow down playback" and/or "slow down" during a first portion responsive to determining the first portion includes fast speech, while not so biased during a second portion responsive to determining the second lacks fast speech.

In these and other manners, robustness and/or accuracy of speech processing is improved through dynamic speech processing adaptation over the duration of the content. For example, the adaptation can result in term(s) being more likely to be determined to be spoken during rendering of certain portion(s) of the content to which they are relevant, while also preventing the term(s) from being more likely to be determined to be spoken during rendering of certain other portion(s) of the content to which they are not relevant (or at least less relevant). As a result, fulfillment(s) performed, based on determining those term(s) are spoken, are more likely to occur during the portion(s) without a user having to speak those term(s) again and/or utilize non-voice input(s) to cause performance of the fulfillment(s). For example, biasing toward "volume up" during a quiet portion of content can obviate the need for the user to have to speak "volume up" multiple times to cause fulfillment of actually turning the volume up and/or obviate the need for the user to instead touch interact with a software or hardware interface element to cause the fulfillment. Further, the fulfillment(s) are less likely to occur during the other portion(s), mitigating occurrence of inadvertent occurrence of the fulfillment(s), which can result in processing of additional user input(s) provided to rectify the occurrence of the inadvertent occurrence of the fulfillment(s). For example, not biasing toward "volume up" (or even biasing away from "volume up") during a loud portion of content can obviate inadvertent occurrences of turning the volume up during the loud portion, which can result in processing of additional input(s) of the user that seek to turn the volume down after the inadvertent occurrence.

In some additional or alternative versions of those implementations, the speech processing adaptation(s) that are applied during rendering of all or portion(s) of content can be based on feature(s) of the content (e.g., of the portion(s) or the content as a whole) and, optionally, based on historical usage data indicating whether term(s), corresponding to such adaptation(s), were determined to be spoken during prior renderings of content (the same and/or additional content) having those feature(s). As one example, processing can be biased toward "next" and/or "skip" during at least portion(s) of rendering of a song in response to determining the song has the feature(s) of having a low match score and/or of having a low overall popularity score. On the other hand, processing can not be biased toward (or at least biased less so) "next" and/or "skip" during rendering of an alternate song in response to determining the alternate song has the feature(s) of having a high match score and/or of having a high overall popularity score. In some implementations, the match score for a song (or other content) can be based on conformance between preference(s) (inferred or explicit) of a user that requested the song and characteristic(s) of the song. For example, for a user that frequently listens to folk music but infrequently listens to rock music, a folk music song can have a lower match score for the user than a rock song would for the user. In some implementations, the match score for a song (or other content) that is rendered responsive to a request can additionally or alternatively be based on a confidence measure that reflects whether the song is responsive to the request. For example, assume a request of "play hypothetical song". If there are three songs titled "hypothetical song" that are each by a different artist, then the selected song can have a lower confidence score than if there is only one song titled "hypothetical song" that is selected. Optionally, applying such biasing can be based on historical usage data indicating a statistically significant higher rate of determining "next" and/or "skip" (and/or of a corresponding fulfillment) during song(s) having a low match score and/or low overall popularity score as compared to the rate during song(s) having a higher match score and/or higher overall popularity score. As one example, processing can be biased toward "down" and/or "volume down" during at least portion(s) of rendering of a video in response to determining that audio, of the video during the portion(s), has certain acoustic feature(s), such as loudness feature(s) (e.g., root mean square (RMS) measure and/or loudness measure full scale (LMFS) measure) that indicate perceived loudness above a threshold. On the other hand, processing can not be biased toward (or at least biased less so) "down" and/or "volume down" during rendering of alternate portion(s) of the video (or alternate video(s)) when corresponding loudness feature(s) do not indicate perceived loudness above the threshold. Optionally, applying such biasing can be based on historical usage data indicating a statistically significant higher rate of determining "down" and/or "volume down" (and/or of a corresponding fulfillment) during rendering of portion(s) of audio having such loudness feature(s). As yet another example, processing can be biased toward "volume down" and/or "volume up" dynamically in correlation with loudness feature(s). For instance, as an RMS measure increases, the likelihood of "volume down" being recognized can increase and/or the likelihood of "volume up" being recognized can decrease. Conversely, as an RMS measure decreases, the likelihood of "volume up" being recognized can increase and/or the likelihood of "volume down" being recognized can decrease.

In these and other manners, robustness and/or accuracy of speech processing is improved through dynamic speech processing adaptation in dependence on feature(s) of content being rendered. As described herein, such feature(s) can include feature(s) that are distinct from a generic genre classification of the content and the feature(s) can include those that are for an entirety of corresponding content (e.g., the entirety of a song, the entirety of an album, the entirety of a show, the entirety of a series) and/or those that are for only portion(s) of corresponding content. Non-limiting examples of such feature(s) include loudness feature(s) (e.g., RMS and/or LUFS measure(s)), rate of speech feature(s) (e.g., slow speech, fast speech, normal speech), beats per minute (bpm) feature(s) (e.g., tempo of a song), temporal feature(s) (e.g., first X seconds or first Y % and/or last X second or last Y %), and/or other feature(s). Such feature(s) can additionally or alternatively include feature(s) that are not derivable directly from processing of the audio and/or video of such content, such as match score(s) and/or popularity measure(s) for the content. Accordingly, speech processing adaptation can be performed in response to determining granular feature(s) are present and/or absent, which can enable fine-tuned adaptation toward and/or away from certain term(s). As also described herein, the adaptation(s) that are performed for certain feature(s) can be based on historical usage data, thereby ensuring that the adaptation(s) will, at least in the aggregate, result in improved speech processing performance. As a result, fulfillment(s) performed, based on determining term(s) are spoken during rendering of content, are more likely to occur when relevant and without a user having to speak those term(s) again and/or utilize non-voice input(s) to cause performance of the fulfillment(s). Further, the fulfillment(s) are less likely to occur when not relevant, mitigating occurrence of inadvertent occurrence of the fulfillment(s).

As one example of some implementations disclosed herein, playback of media (e.g., a movie, a song, an audiobook) can be rendered in response to a user providing a spoken utterance to the automated assistant. For instance, the spoken utterance can be "Assistant, continue playing the movie I was watching last night," and, in response to the spoken utterance, the automated assistant can cause a particular computing device (e.g., a smart television) to continue rendering a movie from where the user left off the night before. Content of a remaining portion of the movie can be processed to determine whether certain requests to the automated assistant may be relevant to one or more remaining portions of the movie. For example, processing of the content can indicate that an amplitude of movie audio increases (relative to a prior portion) and/or satisfies an amplitude threshold during a first portion of the movie when an "explosion" occurs, and therefore a volume-change request can be determined to be relevant to that first portion of the movie. For instance, RMS processing of audio of the content can be performed to determine average loudness of the first portion, and that average loudness determined to satisfy the amplitude threshold. Alternatively, or additionally, visual features of the movie can change during a second portion of the movie when an interlude occurs, and therefore a pause request can be determined to be relevant to that second portion of the movie (e.g., when the user wants to take an intermission). As another example, a stop request can additionally or alternatively be determined to be relevant to an end portion of the movie based on temporal feature(s) (e.g., it being the last X minutes of the movie) and/or visual feature(s) (e.g., that indicate credits are being rendered).

As playback of the movie continues, speech processing can be dynamically biased according to the identified relevant requests. For example, ASR can be biased towards term(s) associated with the first request (e.g., "volume," "turn," "down," "lower," etc.) during the first portion of the movie. Additionally, or alternatively, ASR can be biased towards terms associated with the second request (e.g., "pause," "stop," "break," etc.) during the second portion of the movie. As a result, the automated assistant, during those particular portions of playback, will have a higher probability of, and/or a lower threshold for, responding to a spoken utterance that includes those terms. For example, the speech processing of audio data characterizing the spoken utterance can optionally result in candidate interpretations of the spoken utterance. A priority of a particular candidate interpretation that includes one or more terms can be adjusted based on the spoken utterance being received when a portion of content being rendered is relevant to a request that is associated with the one or more terms. Alternatively, or additionally, a threshold for initializing performance of a particular operation in response to a spoken utterance can be adjusted according to content being rendered, or expected to be rendered, at a computing device.

In some implementations, speech processing for one or more requests can be adjusted according to content that is being rendered, or expected to be rendered, at a computing device. For example, parameters associated with a speech model (e.g., a warm word model described above) that is utilized when processing a particular request (e.g., volume level change requests such as "volume up," "volume down," etc.) can be adjusted based on content to be rendered at a computing device. A parameter can be, for example, a threshold for determining whether a certain request has been submitted by a user to the automated assistant. For example, content being rendered at a computing device can include music that is set to an output volume level of 9 out of 10. When this volume setting for the rendered content is imposed, the automated assistant can determine that a user is estimated to more likely provide a request for lowering the volume setting, compared to other requests. Based on this determination, a threshold for detecting whether processed audio data includes a request to lower the volume can be adjusted such that spoken inputs captured in the audio data can be more readily interpreted as requests to lower volume. For example, when the volume is set to 9 out of 10, and the user provides a spoken utterance such as "down," the automated assistant can respond to the spoken utterance as a volume "down" request (e.g., respond by performing an operation of modifying playback by reducing a volume level). In some implementations, this response can be based on a threshold for a volume-down request being set to 0.9, when a current volume, x, is less than or equal to 7 and being set to 0.5 when the current volume x is greater than 7. In other words, when a speech model (e.g., a warm word model trained to detect occurrences of "volume down") is utilized to process audio data and generate output (e.g., a probability from 0.0 to 1.0) that indicates whether the audio data includes certain word(s) and/or phrase(s), the output can be compared to a threshold that is dynamically adjusted according to content being rendered, or expected to be rendered, at a computing device.

As a particular example, assume that a client device includes a volume up warm word model that can be utilized to process audio data and generate a probability that indicates whether "volume up" is present in the audio data, where values closer to 1.0 indicate a greater probability that "volume up" is present than do values closer to 0.0. Further assume that the client device includes a volume down warm word model that can be utilized to process audio data and generate a probability that indicates whether "volume down" is present in the audio data, where values closer to 1.0 indicate a greater probability that "volume down" is present than do values closer to 0.0. The volume up and the volume down warm word models can be at least selectively utilized to process audio data captured via microphone(s) of the client device. For example, they can be utilized when music is being rendered by the client device. For instance, volume up probabilities can be generated by processing audio data utilizing the volume up warm word model, and compared to a volume up threshold in determining whether "volume up" is present in the audio data (e.g., determined to be present only when the volume up probability is greater than the volume up threshold). When it is determined that "volume up" is present in the audio data (e.g., probability satisfies a volume up threshold), then a corresponding volume up fulfillment can be performed. Further, volume down probabilities can be generated by processing the audio data utilizing the volume down warm word model, and compared to a volume down threshold in determining whether "volume down" is present in the audio data. When it is determined that "volume down" is present in the audio data (e.g., probability satisfies a volume down threshold), then a corresponding volume down fulfillment can be performed.

Continuing with the particular example and according to implementations disclosed herein, the volume up threshold and/or the volume down threshold can be dynamically adapted according to content being rendered. For example, when the client device is rendering music at a volume setting of 4 of 10, 5 of 10, or 6 of 10 the volume down threshold and the volume up threshold can be the same (e.g., 0.85). However, when the client device is rendering music at a volume setting of 7 of 10 or greater, the volume down threshold can be decreased and/or the volume up threshold can be increased, thereby increasing the likelihood that "volume down" will be determined to be present in such situations and/or decreasing the likelihood that "volume up" will be determined to be present in such situations. Additionally or alternatively, when the client device is rendering music at a volume setting of 3 of 10 or less, the volume down threshold can be increased and/or the volume up threshold can be decreased, thereby increasing the likelihood that "volume up" will be determined to be present in such situations and/or decreasing the likelihood that "volume down" will be determined to be present in such situations. As another example, when the client device is rendering music the volume down threshold and the volume up threshold can be the same (e.g., 0.85). However, when the client device is rendering an advertisement between songs, the volume down threshold can be decreased and/or the volume up threshold can be increased, thereby increasing the likelihood that "volume down" will be determined to be present in such situations and/or decreasing the likelihood that "volume up" will be determined to be present in such situations. As yet another example, when the client device is rendering certain portions of a movie the volume down threshold and the volume up threshold can be the same (e.g., 0.85). However, when the client device is rendering alternate portion(s) of the movie (e.g., those indicated by historical data as frequently resulting in a volume increase—e.g., a quiet talking scene), the volume down threshold can be increased and/or the volume up threshold can be decreased, thereby increasing the likelihood that "volume up" will be determined to be present in such situations and/or decreasing the likelihood that "volume down" will be determined to be present in such situations.

In some implementations, adjusting a threshold for a warm word model can include, instead of adjusting the threshold itself, keeping the threshold static but selectively applying a boost or reduction to output generated using the warm word model. For example, a static threshold of 0.80 can be used for a volume up warm word model and can remain static. However, a boost (e.g., 10% increase) can be applied to outputs generated using the volume up warm word model during portion(s) of content for which "volume up" is determined to be relevant and/or a reduction (e.g., 10% decrease) can be applied to outputs generated using the volume up warm word model during portion(s) of content for which "volume up" is determined to not be relevant. Additionally or alternatively, no boost and no reduction can be applied to outputs generated using the volume up warm word model during portion(s) of content for which "volume up" has not been determined to be relevant.

As an additional particular example, assume a client device includes a next warm word model that can be utilized to process audio data and generate a probability that indicates whether "next" is present in the audio data, where values closer to 1.0 indicate a greater probability that "next" is present than values closer to 0.0. The next warm word model can be at least selectively utilized to process audio data captured via microphone(s) of the client device. For example, it can be utilized at least when music is being rendered by the client device, and determining presence of "next" can result in fulfillment of skipping to the next song when "next" is determined to be present utilizing the next warm word model. As another example, it can be utilized when a list of items is being rendered by the client device, and determining presence of "next" can result in fulfillment of skipping to the next item in the list (and halting rendering of the current item). For instance, next probabilities can be generated by processing audio data utilizing the next warm word model, and compared to a next threshold in determining whether "next" is present in the audio data (e.g., determined to be present only when the next probability is greater than the next threshold).

Continuing with the additional particular example and according to implementations disclosed herein, the next threshold can be dynamically adapted according to content being rendered. For example, when the client device is rendering a song the next threshold can be a lower threshold during an initial portion (e.g., the first 10 seconds) of a song and/or a concluding portion (e.g., the last 10 seconds) of the song, and a higher threshold during other portion(s) of the song. Accordingly, the likelihood that "next" is determined to be present can be increased during the initial portion and/or the concluding portion of the song, which can correspond to portion(s) during which users are more likely to speak "next" (e.g., more likely to speak "next" at the beginning of playback of a song that the user does not like). In these and other manners, the likelihood of determining "next" is spoken in audio data is dynamically adapted during the duration of playback of the song and in dependence on characteristic(s) of the rendering of the song (e.g., an amount of the song that has been played back thus far and/or an amount of the song remaining to play back). As another example, when the client device is rendering a list of candidate restaurants and corresponding brief descriptions (e.g., responsive to a request of "restaurants nearby") the next threshold can be a lower threshold during an initial portion (e.g., the first 40%) of rendering of each item in the list, and a higher threshold during the remaining portion of rendering of each item in the list. For instance, if the list is being audibly rendered and an item in the list is "Hypothetical Cafe—1 mile away and serving staples in a contemporary setting", the next threshold can be a lower threshold during audible rendering of "Hypothetical Cafe" and a higher threshold during audible rendering of "1 mile away and serving staple in a contemporary setting". Accordingly, the likelihood that "next" is determined to be present can be increased during the initial portion of rendering of an item in a list, which can correspond to a portion during which users are more likely to speak "next".

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/ or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
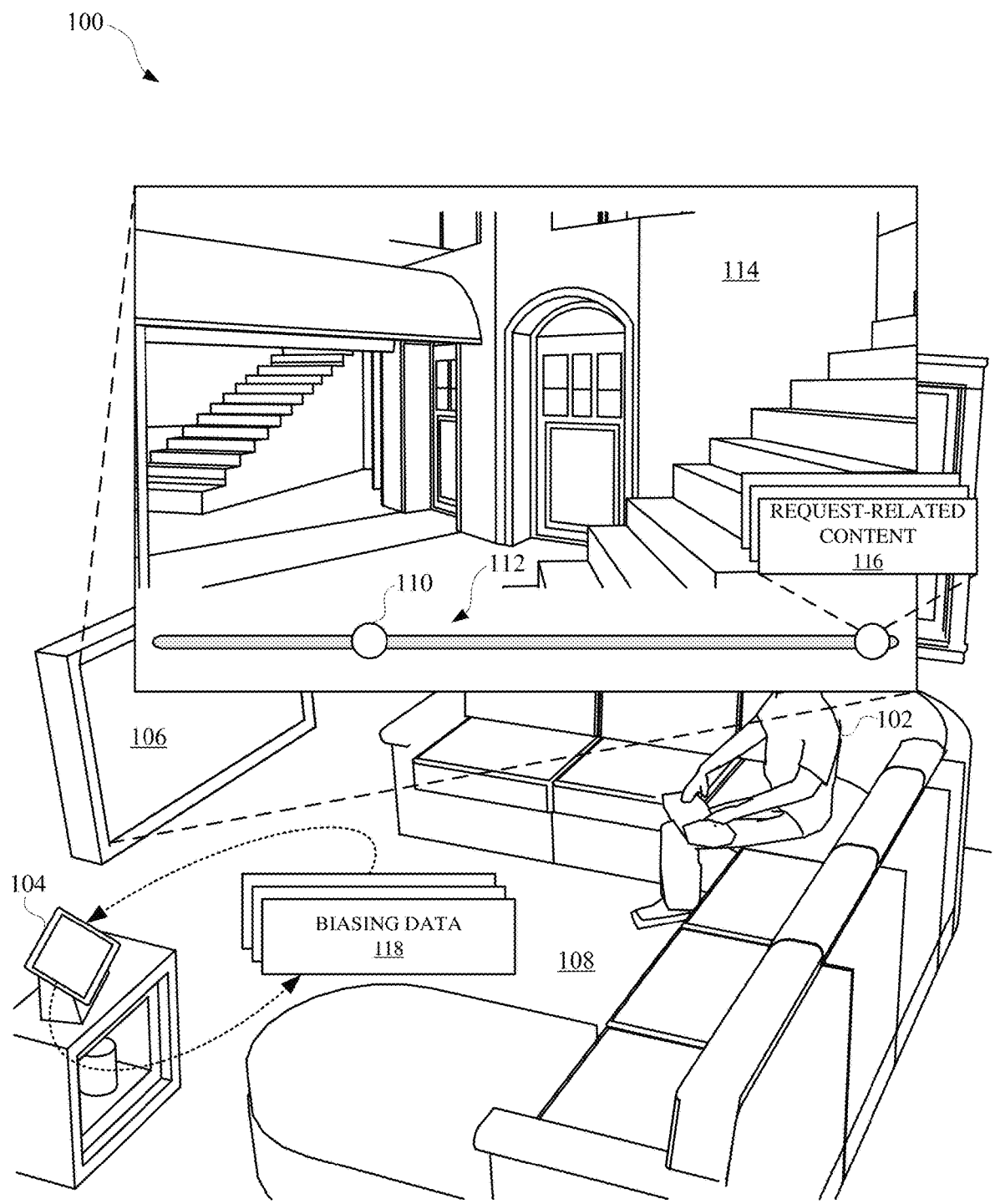
FIG. 1A, FIG. 1B, and FIG. 1C illustrate views of a user interacting with an automated assistant that can bias speech processing according to features of rendered content that are determined to be relevant to certain assistant requests.
Figure 1B:
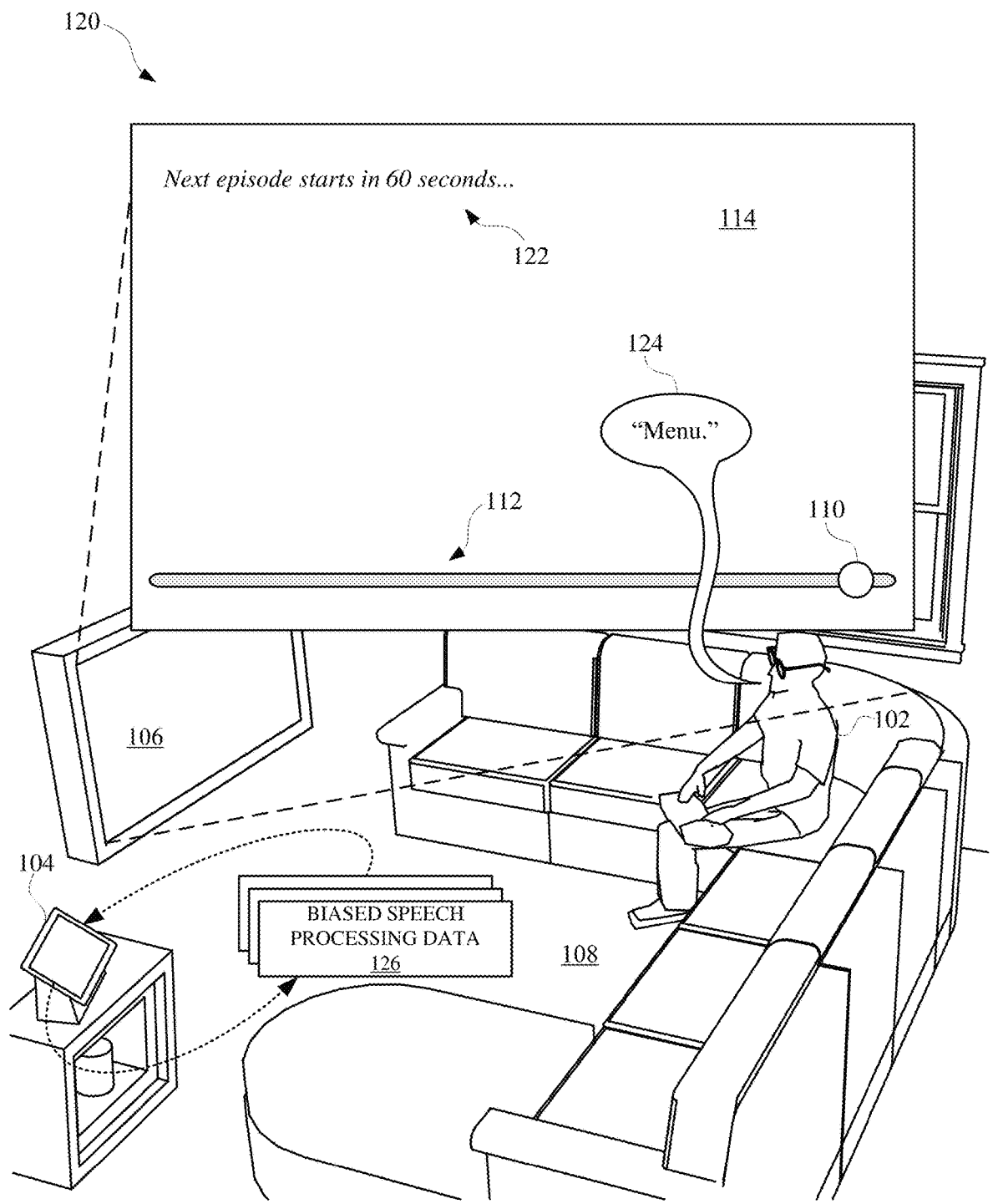
Figure 1C:
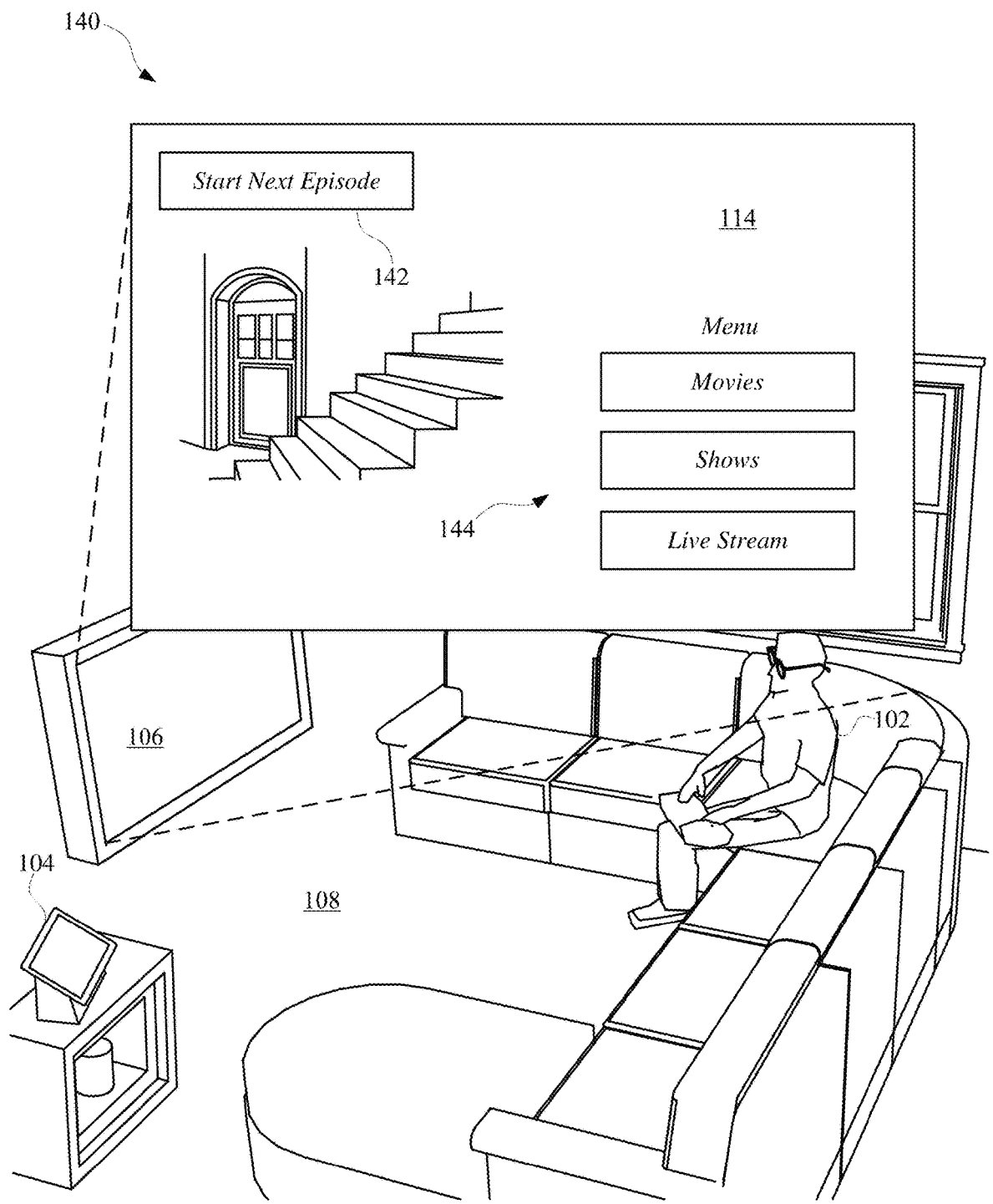

FIG. 1A, FIG. 1B, and FIG. 1C illustrate a view 100, a view 120, and a view 140 of a user 102 interacting with an automated assistant that can bias speech processing according to features of rendered content that are determined to be relevant to certain assistant requests. For example, the user 102 can be viewing a portion of content rendered at a display interface 114 of a computing device 106 (e.g., a television). The portion of content can be a streaming show that can have a duration of playback, as indicated by a progress bar 112, and a current frame or frames being rendered at the display interface 114 can correspond to a progress element 110 of the progress bar. In some implementations, an automated assistant that is accessible via the computing device 106 and/or another computing device 104 can process data associated with the content to determine whether certain assistant operations may be relevant to certain portions of the content.

For example, when the user 102 is viewing content when the progress element 110 of the progress bar 112 is near a middle of a duration of playback, the automated assistant can determine that a subsequent portion of the content may be relevant to a particular assistant request. The subsequent portion of content can correspond to request-related content 116, which can be characterized by content data. The content data can be processed by the automated assistant to determine that the subsequent portion of the content is relevant to a particular assistant request, such as a request to see a "menu" of an application that is rendering the content. In some implementations, a degree of relevance of content that is being rendered, or will be rendered, by a computing device can be determined using one or more heuristic processes and/or one or more trained machine learning models. For example, the content data can be processed, using one or more trained machine learning models, to generate one or more embeddings that can be mapped to a latent space(s). A distance in latent space between the embedding and another existing embedding corresponding to a particular assistant request and/or action can be determined. When the distance satisfies a distance threshold, the particular assistant request can be determined to be relevant to the subsequent portion of content. In some implementations, features of the content such as text, images, audio, volume, brightness, and/or other features can be processed to determine a relevance of the content to certain requests and/or operations. For example, text 122 rendered during a final portion of the content can be utilized as a basis for concluding that a particular request (e.g., a request to "skip" to see a next episode element 142 and/or see a menu 144) is relevant during that final portion of the duration of the content.

In some implementations, historical usage data can indicate, with prior permission from users, when users have historically interacted with their automated assistant during certain portions of content playback. The historical usage data can be processed to determine whether a portion of the content that the user 102 is currently viewing and/or is expected to be viewing is associated with certain assistant request(s). When an assistant request is determined to be relevant to and/or otherwise associated with the content, according to one or more processes, the automated assistant can generate biasing data 118. The biasing data 118 can indicate that a threshold for determining whether a particular request was received should be adjusted during rendering of the corresponding portion of content. In some implementations, the biasing data 118 can indicate to bias speech processing (e.g., ASR processing and/or warm word processing) for a first request (e.g., a request to "skip" to see a next episode element 142) when a first portion of content is being rendered (e.g., the content corresponding to progress element 110 at FIG. 1A), but not bias speech processing (or bias differently) for the first request when a second portion of content is being rendered (e.g., the content corresponding to the progress element 110 at FIG. 1B). Alternatively, or additionally, the biasing data 118 can indicate to not bias speech processing for a second request (e.g., a request to see the menu 144) when the first portion of the content is being rendered, but bias speech processing for the second request when the second portion of the content is being rendered.

For example, when the computing device 106 is rendering a second portion of the content, as illustrated in view 120 of FIG. 1B, the user 102 can provide a spoken utterance 124 such as "Menu." This spoken utterance 124 may or may not include an invocation phrase for invoking an automated assistant. However, audio data characterizing the spoken utterance 124 can be processed, with prior permission from the user 102, to determine whether the user 102 is requesting the automated assistant to perform a particular operation. For example, speech processing model(s) can be utilized when processing audio data to determine whether the user 102 is requesting certain operations to be performed—despite not leading the request with an invocation phrase. The automated assistant can process the audio data corresponding to the spoken utterance 124 to generate biased speech processing data 126. The biased speech processing data 126 can indicate whether a score for the spoken utterance 124 satisfies a threshold value for a particular request (e.g., a request to see a "menu"). For example, biasing data 118 can indicate an adjusted threshold value that the score should be compared to, and, when the score satisfies the adjusted threshold value, the automated assistant can initialize performance of one or more operations in furtherance of satisfying the particular request.

In accordance with the example illustrated in FIG. 1B, the automated assistant can determine that user 102 provided the particular request during a duration of playback when the biasing data 118 indicated to bias speech processing towards a "menu" command. In some implementations, the speech processing can be biased towards the "menu" command during the second portion of the content based on historical usage data indicating that multiple other users requested to see the menu of the application during rendering of the second portion of the content. Alternatively, or additionally, contextual data can be processed with the content data to determine that the user 102 has previously issued a request for the automated assistant to render a "menu" when the duration of playback has an ending that is within a threshold duration of time. Therefore, when the progress element 110 arrives within the threshold duration of time (e.g., a length of remaining time that is X % of the total duration of time), speech processing for determining whether a "menu" request was received can be biased towards the "menu" request.

In other words, a score regarding whether the spoken utterance 124 includes a "menu" request can be a "9" out of 10, and the adjusted threshold value can be ">6" during the threshold duration of time. Therefore, the score can more readily satisfy the adjusted threshold value than a non-adjusted or a different threshold value, which may be enforced during other portions of playback of the content. For example, during the first half of the duration of playback, the biasing data 118 can indicate that the threshold value for a "menu" request can be ">=9." Therefore, although the spoken utterance 124 would satisfy this threshold during the first half of the duration of playback, the automated assistant would be more readily responsive during the final duration when the adjusted threshold value is enforced. Moreover, the spoken utterance may not be scored as a "9" when other audible interference is occurring during the first half of the duration of playback. Biasing according to content can prevent false positives for other requests that the user 102 may issue to the automated assistant when watching certain portions of content. As a result, by mitigating a number of instances of false positives, computational resources such as network bandwidth and processing can be preserved at devices that may provide access to the automated assistant, or otherwise may be controllable via the automated assistant.

Figure 2:
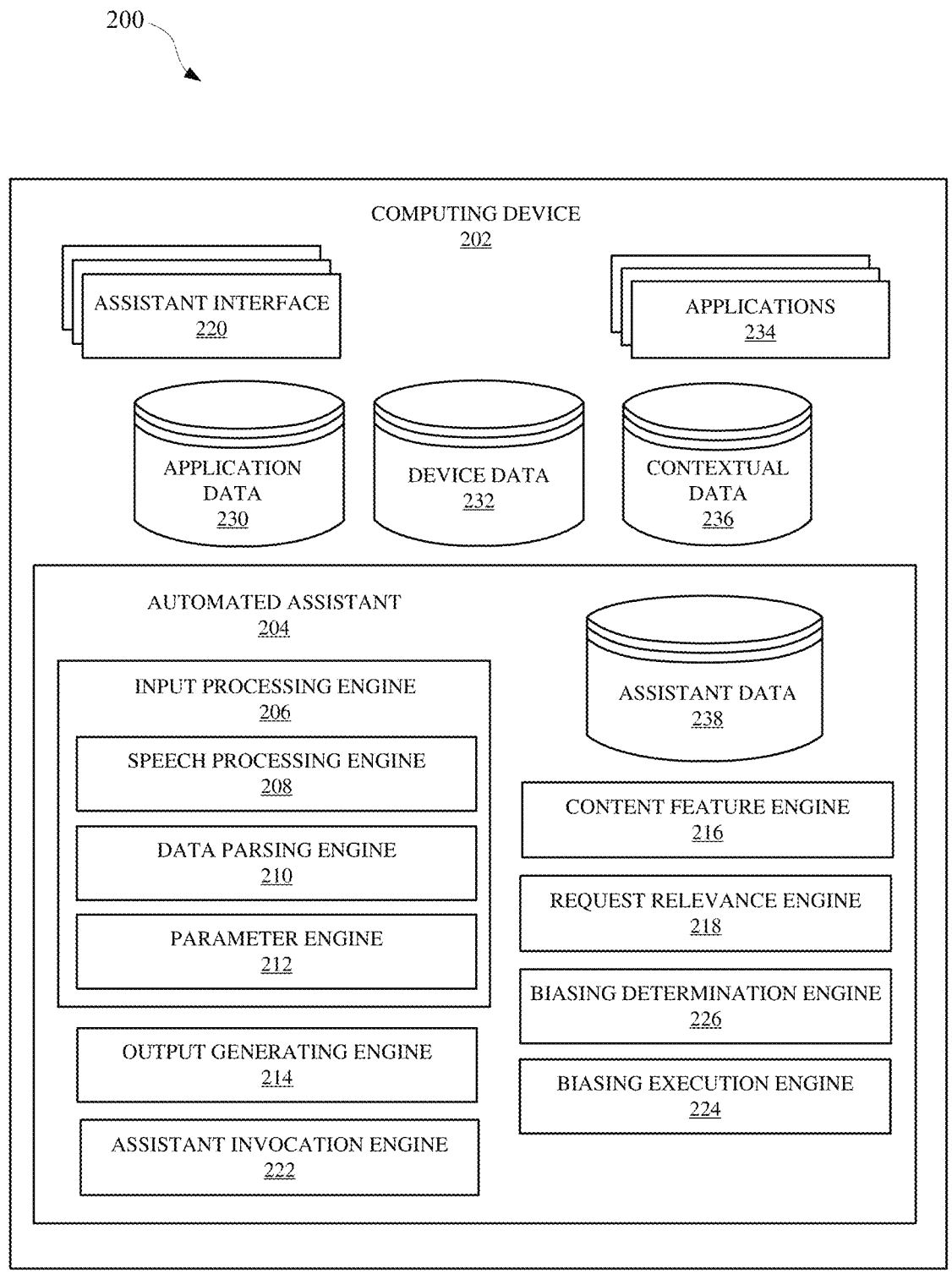
FIG. 2 illustrates a system for biasing speech processing (or other assistant input) towards certain requests according to whether those requests are relevant to content that is being rendered, or is expected to be rendered, at a computing device.

FIG. 2 illustrates a system 200 for biasing speech processing (or biasing of other input processing) towards and/or away from certain requests according to whether those requests are relevant, or not relevant, to content that is being rendered, or is expected to be rendered, at a computing device. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include a content feature engine 216 that can process content data, which characterizes content, in furtherance of identifying features of the content. The content data can characterize content that is currently being rendered at an interface, is expected to be rendered, and/or was previously rendered at an interface. In some implementations, the content feature engine 216 can access the content data, with prior permission from a user, by performing a screenshot, or other operation for capturing content that is being rendered by a computing device. Alternatively, or additionally, the content feature engine 216 can access the content data by retrieving application data 230 from one or more applications that may be assisting with rendering of the content. In some implementations, features of the content can be identified by processing the content data using one or more heuristic processes and/or one or more trained machine learning models. For example, one or more trained machine learning models can be utilized to identify objects in frames of video that can be rendered at a computing device. Alternatively, or additionally, one or more trained machine learning models can be utilized to identify contextual features that may be apparent when a computing device is rendering content.

In some implementations, the system 200 can include a request relevance engine 218 that can determine a degree of relevance of a content feature to a particular request that can be fulfilled by the automated assistant and/or an operation that can be performed by the automated assistant. In some implementations, the degree of relevance can be determined using one or more heuristic processes and/or one or more trained machine learning models. For example, when a particular feature (e.g., a countdown timer) of content (e.g., a movie) is identified, historical usage data can be processed to determine whether one or more users issued certain assistant requests (e.g., a request to "pause" playback) when that particular feature (e.g., the countdown timer) was previously rendered during rendering of content (e.g., a different movie). In some implementations, a degree of relevance for a particular request can be determined based on how many users previously issued a particular request during the rendering of the particular feature. For example, "next" can be determined to be relevant to an initial duration of songs (generally, or certain songs) based on historical usage data indicating a threshold quantity and/or rate of occurrences of users explicitly invoking the automated assistant (e.g., through speaking an invocation utterance such as "OK Assistant") and speaking "next". Based on such determination of relevance, the threshold for a next warm word model during the initial duration of songs can be lowered, making it more likely that "next" will be determined to be present based on processing of audio data using the next warm word model. Notably, with processing of audio data using the next warm word model the automated assistant need not be explicitly invoked for "next" to be detected in corresponding audio data and a corresponding fulfillment (e.g., skipping to the next song) to be performed. As another example, "volume down" can be determined to be relevant to volume settings from 6 to 10 of a device based on historical usage data indicating a threshold quantity and/or rate of occurrences of user(s) adjusting the volume "down" on a device when the volume setting is from 6 to 10. For instance, it can be determined relevant based on the quantity and/or rate of occurrences of volume down adjustments exceeding (e.g., by a threshold amount) occurrences of volume up adjustments. The adjustments of volume settings, indicated by the historical usage data, can be responsive to touch input(s) (e.g., interaction with a software or hardware volume adjustment button) and/or spoken input(s) (e.g., user speaking "volume down" or "volume 5 (or other lesser volume setting). Based on such determination of relevance, the threshold for a volume down warm word model, when audio is being rendered at a volume setting from 6 to 10, can be lowered, making it more likely that "volume down" will be determined to be present based on processing of audio data using the volume down word model.

In some implementations, the request relevance engine 218 that can determine which biasing adaptation(s) to apply based on processing content feature(s) using a trained machine learning model. For example, the trained machine learning model can be trained based on supervised training instances from historical usage data. Each supervised training instance can include training input that includes feature(s) of all or portion(s) of content being rendered when a fulfillment occurred, such as discretizations of loudness feature(s), temporal feature(s), matching feature(s), and/or other feature(s) described herein. Further, each supervised training instance can include training output that includes an indication of the fulfillment. For example, the training output can include a one-hot vector with the hot value indicating which fulfillment (out of multiple fulfillments indicated by the vector) occurred. For instance, if the machine learning model is trained to predict probability for each of multiple fulfillments based on input feature(s), a first value in the output vector can correspond to a first fulfillment (e.g., "volume up"), a second value can correspond to a second fulfillment (e.g., "volume down"), a third value can correspond to a third fulfillment (e.g., "skip"), etc. Continuing with the example, for content being rendered, the request relevance engine 218 can process discretization(s) of feature(s) of the content, using the trained machine learning model, to generate a predicted probability for each of multiple fulfillments. Biasing can then be performed for term(s) related to fulfillment(s), if any, that satisfy threshold(s). For example, if a "volume up" probability satisfies an upper threshold (i.e., has a high probability), a volume up threshold can be adapted to make "volume up" be more likely to be detected in processing of audio data. Also, for example, if a "volume down" probability additionally or alternatively satisfies a lower threshold (i.e., has a low probability), a volume down threshold can be adapted to make "volume down" be less likely to be detected in processing of the audio data. Additional and/or alternative machine learning models can be trained for use in processing of input feature(s) to generate output that indicates which speech processing biasing adaptation(s) to apply (if any) during rendering of content having those input feature(s). For example, an additional or alternative machine learning model can include one that is trained only for use in determining whether "volume up" biasing should be applied (e.g., the output can be a single value that indicates whether "volume up" biasing should be applied).

In some implementations, the system 200 can include a biasing determination engine 226 that can determine whether to bias certain speech processing according to whether certain features of portions of content are being rendered at the computing device 202. For example, threshold values for a variety of different requests can be adjusted dynamically by the biasing determination engine 226, as certain features are temporarily rendered at an interface. In some implementations, biasing can affect models that are utilized to determine whether a request for an operation, of a limited number of operations, has been submitted. For example, a model can be utilized for making a determination of whether a volume-change request has been received, and a sensitivity of this determination can be adjusted according to whether one or more relevant content features are being rendered, or have been rendered within a threshold duration of time.

In some implementations, the system 200 can include a biasing execution engine 224 that can cause the automated assistant 204 to initialize one or more operations in response to receiving a request and according to speech processing biasing. For example, a user can provide a spoken utterance that embodies a particular request, and the computing device 202 can capture the spoken utterance as audio data. The input processing engine 206 can process the audio data, and certain aspects of the processing can be biased according to content that may be rendered at the computing device 202 or a separate computing device. The audio data can be processed to generate a score that indicates a probability and/or a likelihood that the user provided a particular request. The score can be compared to a threshold that may have been adjusted according to the feature(s) that is being rendered at an interface when the spoken utterance was received, or within a threshold duration of receipt of the spoken utterance. When the score satisfies the threshold, the automated assistant 204 can initialize performance of one or more operations in furtherance of fulfilling the particular request.

Figure 3:
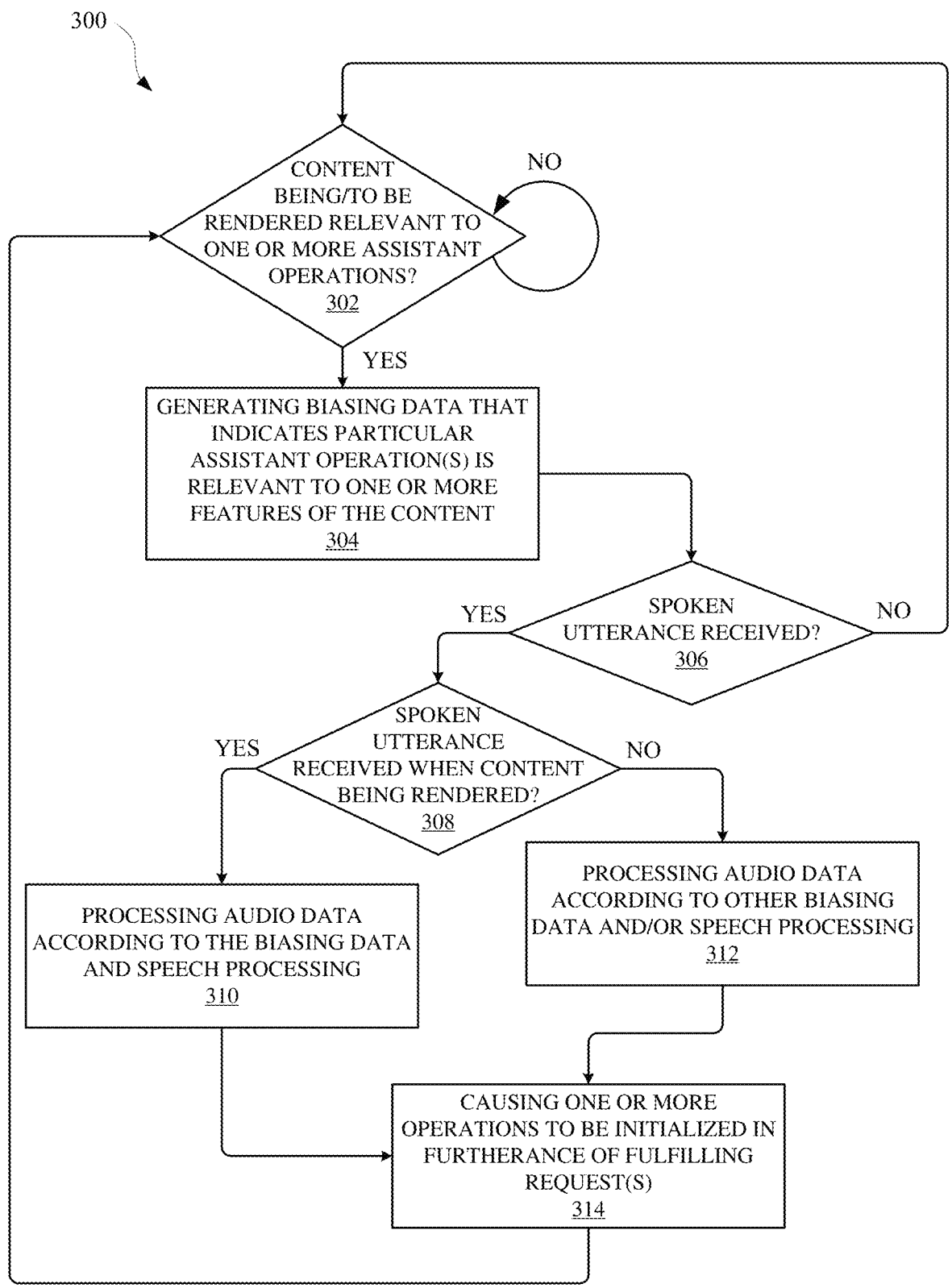
FIG. 3 illustrates a method for biasing speech processing according to whether content being rendered, or to be rendered, at a computing device is associated with one or more requests that can be submitted via a spoken utterance.

FIG. 3 illustrates a method 300 for biasing speech processing according to whether content being rendered, or to be rendered, at a computing device is associated with one or more requests that can be submitted by a user to an automated assistant. The method 300 can be performed by one or more computing devices, applications, and/or any other apparatus or module that can be associated with an automated assistant. The method 300 can include an operation 302 of determining whether content relevant to one or more assistant operations (e.g., operations capable of being initialized by the automated assistant) is being rendered, or is expected to be rendered, at an interface of a computing device. The content can be, for example, audio content, audiovisual content, haptic content, and/or any content rendered through one or more modalities that can be utilized by a user. In some implementations, the content can be audio content and video content that is rendered at a computing device, and the content can include a portion of content that may be relevant to the one or more assistant operations. When the portion of the content is determined to be relevant to the one or more assistant operations, the method 300 can proceed from the operation 302 to an operation 304. Otherwise, the automated assistant can continue to determine whether certain assistant operations may be relevant to certain content that is being, or is expected to be, accessed by a user.

The operation 304 can include generating biasing data that indicates one or more particular assistant operations are relevant to one or more features of content. For example, content data characterizing content that is being, or will be, rendered at the computing device can be processed to determine whether the content is relevant to, and/or is otherwise associated with, one or more assistant operations capable of being initialized by the automated assistant. In some implementations, one or more features of the content can be identified using one or more heuristic processes and/or one or more trained machine learning models. The one or more features can then be compared to one or more assistant operations to determine whether the one or more features are relevant to the assistant operations. In some implementations, historical usage data can also be processed, with prior permission from users, to determine whether users have provided certain requests during rendering of certain content features. Based on this historical usage data, the automated assistant can determine operations that users have historically associated with certain rendered content, and utilize the determined associations for biasing speech processing. For example, a portion of content that includes features of an interlude (e.g., a blank screen, no audio, etc.) can be associated with an operation to skip ahead to other content, and/or stop rendering content and/or stop progress of playback (e.g., a user request to stop video playback). Therefore, biasing data generated based on such portions of content can indicate that speech received during such portions of content should be biased towards requests to "skip" and/or "stop."

Alternatively, or additionally, context associated with content that is to be rendered, and/or is being rendered, can be processed to determine whether certain operations are relevant or otherwise associated with the content. For example, settings of a device can be determined as context to certain content such that speech processing may be biased towards requests for controlling such settings when the certain content is being rendered. In some implementations, a volume of a device can be a contextual feature of content that includes audio of a particular amplitude (e.g., audio amplitude can be estimated and/or determined by one or more sensors). For example, when a volume setting is set to "8" out of "10," the automated assistant can determine to bias speech processing when audio content is being rendered. Alternatively, or additionally, when a volume setting is set to "8" out of "10," the automated assistant can determine to bias speech processing when audio content is being rendered at and/or above a particular threshold (e.g., 100 decibels, as measured using a microphone of a computing device).

The method 300 can proceed from the operation 304 to an operation 306, which can include determining whether a spoken utterance has been received from a user. When a spoken utterance has been received, the method 300 can proceed from the operation 306 to an operation 308. Otherwise, the method 300 can return to the operation 302 for determining whether content is being rendered, or is expected to be rendered, via a computing device. The operation 308 can include determining whether the spoken utterance was received when the content is being rendered. In other words, the automated assistant can determine whether the user provided a spoken utterance when a particular portion of content, corresponding to the biasing data, is being rendered. When the spoken utterance is received during rendering of the content, and/or within a threshold duration of time of the content being rendered, the method 300 can proceed from the operation 308 to an operation 310. Otherwise, the method 300 can proceed from the operation 308 to an operation 312.

The operation 310 can include processing audio data according to the biasing data and speech processing, in furtherance of initializing performance of one or more operations to satisfy a request determined to be embodied in the spoken utterance. When the request corresponds to one or more operations identified as relevant to the rendered content, the biasing data can indicate that speech processing should be biased towards requests that may be directed to those operations. For example, a pause operation can be determined to be relevant to a rendered portion of content because the rendered portion of the content is within a threshold duration of time from an end of the content. Therefore, the biasing data can characterize an adjusted threshold for determining whether to initialize a pause operation in response to a spoken utterance. For example, in some implementations, processing a spoken utterance can include generating scores for certain operations that the spoken utterance may be directed to. Each score can be compared to a respective operation threshold for each respective operation. However, when an operation is determined to be relevant to a portion of content being rendered, the operation threshold can be adjusted during the rendering of the portion of the content, and/or within a threshold duration of time of the rendering of the portion of the content.

As an example, audio data corresponding to the spoken utterance can be processed to determine a score that indicates a likelihood and/or probability that the user is requesting a "pause" operation for the content. Additionally, or optionally, the audio data can be processed to determine another score that indicates a likelihood and/or probability that the user is requesting a "pause" operation for another device or application (e.g., a countdown timer rendered by a kitchen computing device) or is otherwise not directing the spoken utterance to the automated assistant. The score can be compared to an adjusted threshold value (e.g., adjusted according to the biasing data) for determining whether the user provided a request for a "pause" operation to affect the content. When the score satisfies the adjusted threshold value, the method 300 can proceed from the operation 310 to an operation 314 of causing one or more operations to be initialized in furtherance of fulfilling the identified request. For example, when the "pause" operation is determined to have been requested for affecting the content, the automated assistant can communicate with an application that is rendering the content to cause the playback of content to be paused or otherwise stopped.

When the spoken utterance is determined to have been received when the portion of content was not being rendered, the method 300 can proceed from the operation 308 to the operation 312. The operation 312 can include processing audio data according to other biasing data, and/or speech processing that would otherwise be utilized when no biasing data is available. In some implementations, other biasing data may have been generated based on other factors separate from the content being rendered. For example, other biasing data may have been generated based on a user that provided the spoken utterance, a device that captured the spoken utterance, a location of a user that provided the spoken utterance, a state of one or more applications when the spoken utterance was received, and/or any other factors that can provide a basis for biasing speech processing. For example, although a score generated for a "pause" operation may not satisfy a threshold value (e.g., a non-adjusted value) for determining whether the user provided a request to "pause" the content, other scores may be generated in response to the spoken utterance. For example, a separate threshold for pausing a kitchen device (e.g., an autonomous vacuum) may be satisfied in certain contexts when a spoken utterance (e.g., "Pause") is received outside of a threshold duration of time when playback of the portion of content is occurring.

The method 300 can proceed from the operation 312 and/or the operation 310 to an operation 314, which can include causing one or more operations to be initialized in furtherance of fulfilling the request(s). For example, the automated assistant can initialize performance of one or more operations in furtherance of fulfilling a request to pause the playback of content, when a score for the "pause" operation satisfies an adjusted threshold value. Alternatively, the automated assistant can initialize performance of one or more operations in furtherance of fulfilling another request to "pause" an operation of a device (e.g., not the playback of the content) when a score for that other request satisfies another threshold value (e.g., a threshold value associated with an operation for pausing a vacuum operation of an autonomous vacuum). The method 300 can then return to the operation 302 and/or another operation in furtherance of fulfilling a request from the user.

Figure 4:
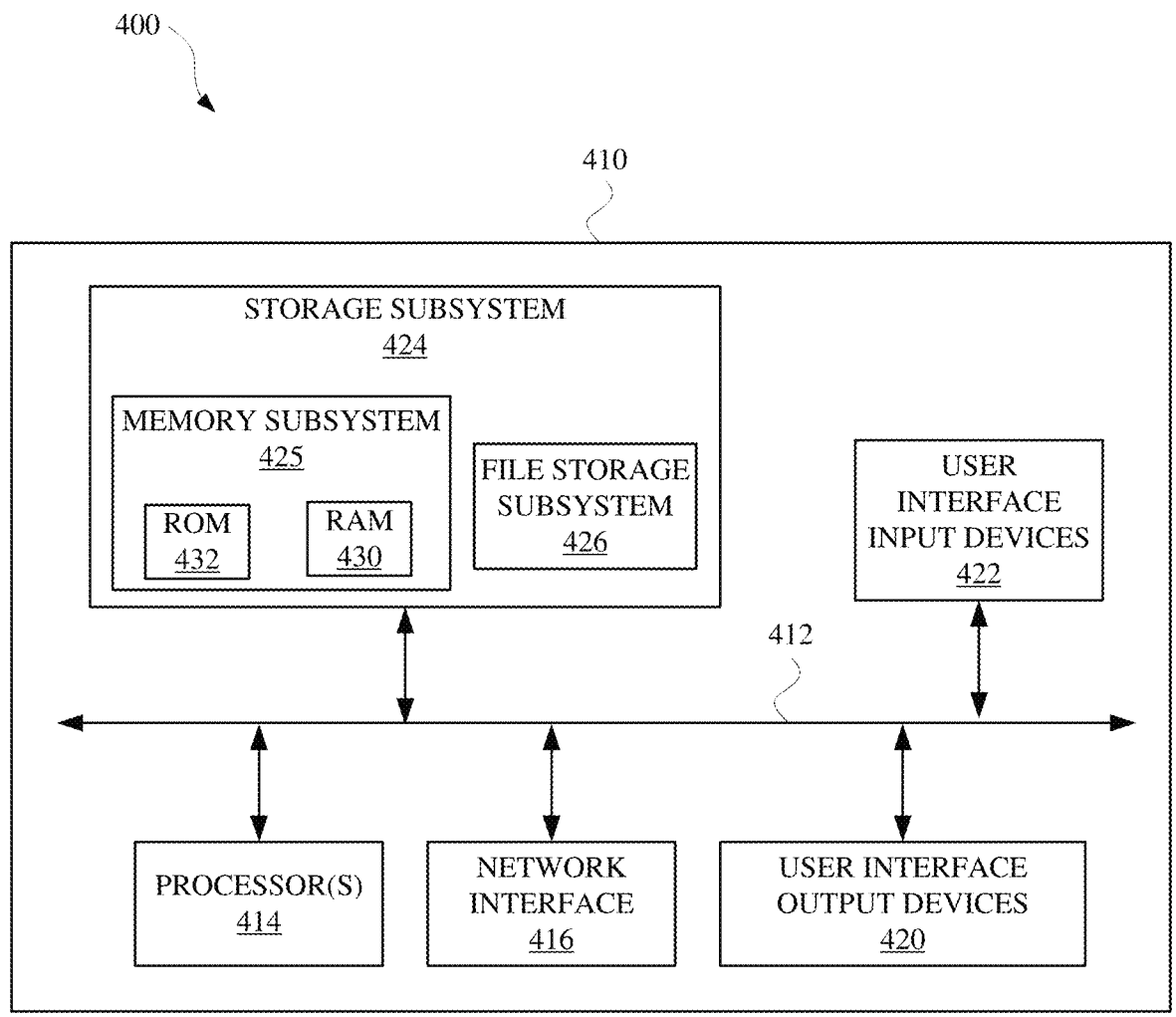
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, computing device 106, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes, during audible rendering of a first portion of content by one or more hardware speakers of a client device: processing audio data, captured by one or more microphones of the client device or an additional client device, using a warm word model to generate output that indicates whether the audio data includes speaking of one or more particular words and/or phrases; identifying a first threshold based on one or more features of the first portion of the content and/or of the audible rendering of the first portion; and in response to identifying the first threshold: determining, based on the output and the first threshold, whether the audio data includes speaking of the one or more particular words and/or phrases, and when it is determined that the audio data includes speaking of the one or more particular words and/or phrases: causing a fulfillment, corresponding to the warm word model, to be performed. The warm word model is trained to generate output that indicates whether the one or more particular words and/or phrases are present in the audio data. The method further includes, during audible rendering of a second portion of the content by the one or more hardware speakers: processing additional audio data, captured by the one or more microphones, using the warm word model to generate additional output that indicates whether the additional audio data includes speaking of the one or more particular words and/or phrases; identifying a second threshold based on one or more alternate features of the second portion of the content and/or of the audible rendering of the second portion; and in response to identifying the second threshold: determining, based on the output and the second threshold, whether the additional audio data includes speaking of the one or more particular words and/or phrases, and when it is determined that the additional audio data includes speaking of the one or more particular words and/or phrases: causing the fulfillment, corresponding to the warm word model, to be performed.

These and other implementations of the technology disclosed herein can include one or more of the following features.

In some implementations, identifying the first threshold is based on the one or more features of the first portion of the content and identifying the second threshold is based on the one or more alternate features of the second portion of the content. In some versions of those implementations, the one or more features of the first portion comprise the first portion being an initial portion of the content and the one or more alternative features of the second portion comprise the second portion being a separate portion of the content that is a non-initial portion of the content. In some of those versions, the method further includes, prior to audible rendering of the content: generating the first threshold based on a quantity and/or rate, in historical usage data, of past occurrences of the fulfillment during past audible renderings having the one or more features; and assigning the first threshold to the one or more features. In some of those versions: the content is a song and the fulfillment includes causing rendering of the song to cease and causing rendering of an alternate song; the content is an item in a list of items, and the fulfillment includes causing rendering of the item to cease and causing rendering of a next item in the list of items; or the content is a song and the fulfillment includes adjusting a volume of the audible rendering of the content. In some other versions of those implementations, the one or more features of the first portion comprise the first portion being a concluding portion of the content and the one or more alternative features of the second portion comprise the second portion being a separate portion of the content that is a non-concluding portion of the content.

In some implementations, the method further includes, prior to audible rendering of the content: generating the first threshold based on a quantity and/or rate, in historical usage data, of past occurrences of the fulfillment during past audible renderings having the one or more features; and assigning the first threshold to the one or more features.

In some implementations, identifying the first threshold is based on the one or more features of the audible rendering of the first portion of the content and identifying the second threshold is based on the one or more alternate features of the audible rendering of the second portion of the content. In some versions of those implementations, the one or more features of the audible rendering of the first portion of the content include a first volume of the audible rendering of the first portion of the content and the one or more alternate features of the audible rendering of the second portion of the content include a second volume of the audible rendering of the second portion of the content. In some of those versions, the fulfillment includes decreasing a volume of the audible rendering of the content and/or the one or more microphones are of the client device and processing the audio data and processing the additional audio data are performed at the client device.

In some implementations, the one or more features of the first portion of the content include a loudness measure of the first portion of the content and the one or more alternate features of the second portion of the content include a second loudness measure that is distinct from the first loudness measure.

In some implementations, a method implemented by processor(s) is provided and includes, during audible rendering of content by one or more hardware speakers of a client device: processing audio data, captured by one or more microphones of the client device, using a warm word model to generate output that indicates whether the audio data includes speaking of one or more particular words and/or phrases; selecting, from a plurality of candidate thresholds and based on feature(s) of the content and/or of audible rendering of the content, a particular threshold; and in response to selecting the particular threshold: determining, based on comparing the output to the particular threshold, whether the audio data includes speaking of the one or more particular words and/or phrases, and when it is determined that the audio data includes speaking of the one or more particular words and/or phrases: causing a fulfillment, corresponding to the warm word model, to be performed. The warm word model is trained to generate outputs that indicate whether the one or more particular words and/or phrases are present in the audio data.

These and other implementations of the technology disclosed herein can include one or more of the following features.

In some implementations, selecting the particular threshold is based on the one or more features of the content. In some versions of those implementations, the audible rendering of the content is in response to user input received in association with a user account, and the one or more feature of the content include a match score of the content, such as a match score generated based on an extent to which the content matches the user input and/or an extent to which the content matches user account features of the user account. In some additional or alternative versions of those implementations, the one or more features of the content include an overall popularity measure of the content. In some additional or alternative versions of those implementations, the one or more features of the content include one or more acoustic features of an audio portion of the content, such as a root mean square (RMS) measure and/or a loudness unit full scale (LUFS) measure.

In some implementations, a method implemented by processor(s) is provided and includes, during audible rendering of content by one or more hardware speakers of a client device: processing audio data, captured by one or more microphones of the client device, using a warm word model to generate output that indicates whether the audio data includes speaking of one or more particular words and/or phrases; determining, based on one or more features of the content and/or of the audible rendering of the content, to apply a boost to the output to generate a boosted output; and determining, based on comparing the boosted output to a threshold, whether the audio data includes speaking of the one or more particular words and/or phrases; and when it is determined that the audio data includes speaking of the one or more particular words and/or phrases: causing a fulfillment, corresponding to the warm word model, to be performed. The warm word model is trained to generate outputs that indicate whether the one or more particular words and/or phrases are present in the audio data;

In some implementations, a method implemented by processor(s) is provided and includes determining, by an automated assistant at a computing device, one or more features of content that can be rendered via an interface of a computing device or a separate computing device. The method further includes generating, based on the one or more features of the content, biasing data that indicates a particular assistant operation is more relevant to the one or more features of the content than other assistant operations. The method further includes receiving, by the automated assistant, a spoken utterance from a user while the content is being rendered via the interface of the computing device or the separate computing device. The method further includes processing, using the biasing data and in response to receiving the spoken utterance, audio data in furtherance of determining a request embodied in the spoken utterance. The audio data embodies at least a portion of the spoken utterance from the user. The method further includes causing, by the automated assistant and in response to receiving the spoken utterance, one or more operations to be performed in furtherance of fulfilling a particular request determined to be embodied in the spoken utterance from the user.

These and other implementations of the technology disclosed herein can include one or more of the following features.

In some implementations, the content being rendered via the interface is audible, the one or more features of the content include a change in audio amplitude of the content, and generating the biasing data includes: determining that an operation of adjusting a volume level of the content is relevant to the one or more features of the content.

In some implementations, the content being rendered via the interface includes video playback, the one or more features of the content include an end of the video playback, and generating the biasing data includes: determining that an operation of modifying playback of the content is relevant to the one or more features of the content.

In some implementations, generating the biasing data that indicates the particular assistant operation is more relevant to the one or more features of the content than other assistant operations includes: assigning an adjusted threshold value to a particular threshold that is utilized when determining whether a user request directs the automated assistant to perform the particular assistant operation.

In some implementations, generating the biasing data that indicates the particular assistant operation is more relevant to the one or more features of the content than other assistant operations includes assigning an adjusted threshold value to a particular threshold when the content is being rendered at the interface of the computing device or the separate computing device, and assigning a different threshold value to the particular threshold when the content is not being rendered at the interface. The particular threshold is utilized when determining whether a user request directs the automated assistant to perform the particular assistant operation.

In some implementations, generating the biasing data that indicates the particular assistant operation is more relevant to the one or more features of the content than other assistant operations includes: determining that at least one other user has submitted a separate request to perform the particular assistant operation to at least one other instance of the automated assistant when the content was previously being rendered via at least one other respective computing device.

In some implementations, the method further includes determining one or more settings of the computing device or the separate computing device that is rendering the content. In those implementations, generating the biasing data is further based on the one or more settings of the computing device or the separate computing device.

In some implementations, the one or more features of the content include an output volume of the content, and the one or more settings include a volume setting for the computing device or the separate computing device.

In some implementations, a method implemented by processor(s) is provided and includes determining, by an automated assistant at a computing device, that content is being rendered via an interface of the computing device or a separate computing device. The content has a duration of playback and one or more features of the content changes during the duration of playback. The method further includes determining, based on the content being rendered, that a first request is relevant to a first portion of the playback, and that a second request is relevant to a second portion of the playback, which is subsequent to the first portion of the playback. The method further includes generating, based on the first request and the second request, biasing data that indicates speech processing for the automated assistant is to be biased towards the first request during the first portion of the playback, and towards the second request during the second portion of the playback. The method further includes receiving, by the automated assistant, a spoken utterance, from a user, that embodies a particular request for the automated assistant to fulfill. The method further includes processing, in response to receiving the spoken utterance and based on the biasing data, audio data that characterizes at least a portion of the spoken utterance from the user. Processing of the audio data is biased towards the first request when the spoken utterance is received during the first portion of the playback, and is biased towards the second request when the spoken utterance is received during the second portion of the playback. The method further includes causing, in response to receiving the spoken utterance and based on processing the audio data, one or more operations to be performed in furtherance of fulfilling an identified request embodied in the spoken utterance.

These and other implementations of the technology disclosed herein can include one or more of the following features.

In some implementations, the first request and/or the second request is a volume-change request and determining that the first request is relevant to the first portion of the playback, and that the second request is relevant to the second portion of the playback includes: determining that the volume-change request is relevant to the first portion of the playback and/or the second portion of the playback.

In some implementations, the first request and/or the second request is a stop request and determining that the first request is relevant to the first portion of the playback, and that the second request is relevant to the second portion of the playback includes: determining that the stop request is relevant to the first portion of the playback and/or the second portion of the playback.

In some implementations, generating the biasing data that indicates speech processing for the automated assistant is to be biased towards the first request during the first portion of the playback includes: assigning an adjusted threshold value to a particular threshold that is utilized for determining whether the first request was provided to the automated assistant.

In some implementations, generating the biasing data that indicates speech processing for the automated assistant is to be biased towards the first request during the first portion of the playback includes: assigning an adjusted threshold value to a particular threshold during the first portion of playback, and assigning a different threshold value to the particular threshold during the second portion of playback. The particular threshold is utilized when determining whether a user request directs the automated assistant to perform the particular assistant operation.

In some implementations, the method further includes determining one or more settings of the computing device or the separate computing device that is rendering the content. In those implementations, generating the biasing data is further based on the one or more settings of the computing device or the separate computing device.

In some implementations, determining that the first request is relevant to the first portion of the playback includes: processing content data using one or more trained machine learning models in furtherance of determining whether the first portion of the playback is relevant to the first request. The content data characterizes a portion of content rendered during the first portion of playback, and the one or more trained machine learning models are trained using data that indicates one or more requests that were submitted by other users during rendering of the portion of the content at other respective devices.

In some implementations, a method implemented by processor(s) is provided and includes determining, by an automated assistant at a computing device, that a portion of content that can be rendered via an interface of the computing device or a separate computing device is relevant to a particular request that is actionable by the automated assistant. The content has a duration of playback and one or more features of the content changes during the duration of playback. The method further includes causing a threshold request value to be adjusted based on a degree of relevance of the particular request to the portion of content. The threshold request value is utilized by the automated assistant as a basis for a threshold for determining whether an assistant input includes the particular request. The method further includes receiving, by the automated assistant, a spoken utterance from a user. The spoken utterance includes a certain request that is actionable by the automated assistant. The method further includes, when the spoken utterance is received during the duration of playback that includes the content: causing the automated assistant to perform one or more operations in furtherance of fulfilling the particular request or another request, according to whether the threshold is satisfied; and when the spoken utterance is not received during the duration of playback that includes the content: causing the automated assistant to perform one or more other operations in furtherance of fulfilling the particular request or the other request, according to whether a separate threshold is satisfied.

These and other implementations of the technology disclosed herein can include one or more of the following features.

In some implementations, determining that the portion of content is relevant to the particular request that is actionable by the automated assistant includes: determining that at least one other user has submitted the particular request to at least one other instance of the automated assistant when the portion of content was previously being rendered via at least one other respective computing device.

In some implementations, the method further includes determining one or more settings of the computing device or the separate computing device that can render the portion of the content. In those implementations, causing the threshold request value to be adjusted is further based on the one or more settings of the computing device or the separate computing device.

In some implementations, determining that the portion of content is relevant to the particular request that is actionable by the automated assistant includes: determining that the particular request was submitted by another user to another instance of the automated assistant when the portion of content was being rendered for the other user.

In some implementations, the particular request corresponds to a particular operation for modifying a setting of an application and/or a device that is not controlling the playback of the portion of the content.

We claim:

1. A method implemented by one or more processors, the method comprising:
    prior to audible rendering of content:
        generating a first threshold based on a quantity and/or rate, in historical usage data, of previous occurrences of causing a previous fulfillment, corresponding to a warm word model, that had been performed during past audible renderings having one or more features; and
        assigning the first threshold to the one or more features;
    during audible rendering of a first portion of the content by one or more hardware speakers of a client device:
        processing audio data, captured by one or more microphones of the client device or an additional client device, using the warm word model to generate output that indicates whether the audio data includes speaking of one or more particular words and/or phrases,
            wherein the warm word model is trained to generate output that indicates whether the one or more particular words and/or phrases are present in the audio data;
        identifying the first threshold, wherein identifying the first threshold is based on the one or more features, the one or more features being of the first portion of the content rendered by one or more of the hardware speakers of the client device and/or of the audible rendering of the first portion of the content by one or more of the hardware speakers of the client device; and
    in response to identifying the first threshold:
        determining, based on the output and the first threshold, whether the audio data includes speaking of the one or more particular words and/or phrases;
        when it is determined that the audio data includes speaking of the one or more particular words and/or phrases:
            causing a fulfillment, corresponding to the warm word model, to be performed;
    during audible rendering of a second portion of the content by the one or more hardware speakers:
        processing additional audio data, captured by the one or more microphones, using the warm word model to generate additional output that indicates whether the additional audio data includes speaking of the one or more particular words and/or phrases,
        identifying a second threshold, wherein identifying the second threshold is based on one or more alternate features, the one or more alternate features being of the second portion of the content rendered by one or more of the hardware speakers of the client device and/or of the audible rendering of the second portion of the content by one or more of the hardware speakers of the client device; and
    in response to identifying the second threshold:
        determining, based on the output and the second threshold, whether the additional audio data includes speaking of the one or more particular words and/or phrases;
        when it is determined that the additional audio data includes speaking of the one or more particular words and/or phrases:
            causing the fulfillment, corresponding to the warm word model, to be performed.

2. The method of claim 1, wherein identifying the first threshold is based on the one or more features of the first portion of the content and wherein identifying the second threshold is based on the one or more alternate features of the second portion of the content.

3. The method of claim 2, wherein the one or more features of the first portion comprise the first portion being an initial portion of the content and wherein the one or more alternative features of the second portion comprise the second portion being a separate portion of the content that is a non-initial portion of the content.

4. The method of claim 3, further comprising:
    prior to audible rendering of the content:
        generating the first threshold based on a quantity and/or rate, in historical usage data, of past occurrences of the fulfillment during past audible renderings having the one or more features; and
        assigning the first threshold to the one or more features.

5. The method of claim 3, wherein the content is a song and the fulfillment comprises causing rendering of the song to cease and causing rendering of an alternate song.

6. The method of claim 3, wherein the content is an item in a list of items, and the fulfillment comprises causing rendering of the item to cease and causing rendering of a next item in the list of items.

7. The method of claim 3, wherein the content is a song and the fulfillment comprises adjusting a volume of the audible rendering of the content.

8. The method of claim 2, wherein the one or more features of the first portion comprise the first portion being a concluding portion of the content and wherein the one or more alternative features of the second portion comprise the second portion being a separate portion of the content that is a non-concluding portion of the content.

9. The method of claim 1, wherein the one or more features of the audible rendering of the first portion of the content comprise a first volume of the audible rendering of the first portion of the content and the one or more alternate features of the audible rendering of the second portion of the content comprise a second volume of the audible rendering of the second portion of the content.

10. The method of claim 9, wherein the fulfillment comprises decreasing a volume of the audible rendering of the content.

11. The method of claim 9, wherein the one or more microphones are of the client device and wherein processing the audio data and processing the additional audio data are performed at the client device.

12. The method of claim 1, wherein the one or more features of the first portion of the content comprise a loudness measure of the first portion of the content and the one or more alternate features of the second portion of the content comprise a second loudness measure that is distinct from the first loudness measure.

13. A method implemented by one or more processors of a client device, the method comprising:
   prior to audible rendering of content:
      generating a particular threshold based on a quantity and/or rate, in historical usage data, of previous occurrences of causing a previous fulfillment, corresponding to a warm word model, that had been performed during past audible renderings having one or more features; and
      assigning the first threshold to the one or more features;
   during audible rendering of the content by one or more hardware speakers of the client device:
      processing audio data, captured by one or more microphones of the client device, using the warm word model to generate output that indicates whether the audio data includes speaking of one or more particular words and/or phrases,
      wherein the warm word model is trained to generate outputs that indicate whether the one or more particular words and/or phrases are present in the audio data;
   selecting, from a plurality of candidate thresholds, the particular threshold, wherein selecting the particular threshold is based on the one or more features of the content rendered by one or more of the hardware speakers of the client device and/or of the audible rendering of the content by one or more of the hardware speakers of the client device; and
   in response to selecting the particular threshold:
      determining, based on comparing the output to the particular threshold, whether the audio data includes speaking of the one or more particular words and/or phrases;
   when it is determined that the audio data includes speaking of the one or more particular words and/or phrases:
      causing a fulfillment, corresponding to the warm word model, to be performed.

14. The method of claim 13, wherein the one or more features of the content include one or more acoustic features of an audio portion of the content.

15. The method of claim 14, wherein the one or more acoustic features include a root mean square (RMS) measure and/or a loudness unit full scale (LUFS) measure.

16. The method of claim 13, wherein the audible rendering of the content is in response to user input received in association with a user account, and wherein the one or more feature of the content include a match score of the content, wherein the match score is generated based on an extent to which the content matches the user input and/or matches user account features of the user account.

17. The method of claim 13, wherein the one or more features of the content include an overall popularity measure of the content.

* * * * *